(No Model.)
J. H. W. SCHMIDT.
INSTRUMENT FOR TAKING AND TRANSFERRING MEASUREMENTS.
No. 412,984. Patented Oct. 15, 1889.
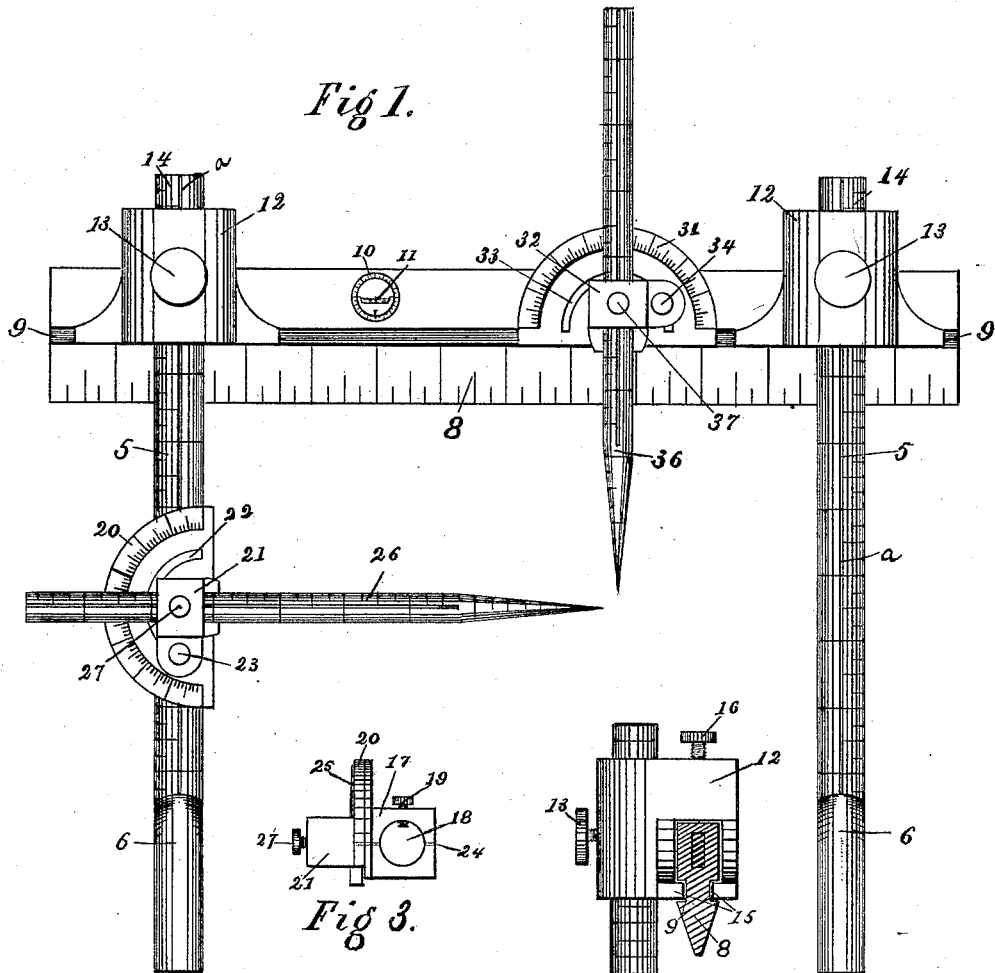
Fig 1.
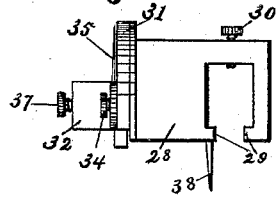
Fig 3.
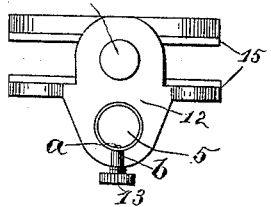
Fig 4.
Fig 5.
Fig 2.
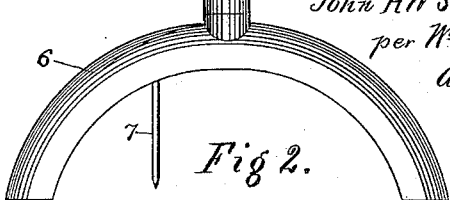
Witnesses:
Louis G. Suemihl
Chas Hibbard
Inventor:
John H W Schmidt
per Wm K White
Attorney.

UNITED STATES PATENT OFFICE.

JOHN H. W. SCHMIDT, OF DAVENPORT, IOWA.

INSTRUMENT FOR TAKING AND TRANSFERRING MEASUREMENTS.

SPECIFICATION forming part of Letters Patent No. 412,984, dated October 15, 1889.

Application filed June 5, 1889. Serial No. 313,252. (No model.)

*To all whom it may concern:*

Be it known that I, JOHN H. W. SCHMIDT, a citizen of the United States, residing at Davenport, in the county of Scott and State of Iowa, have invented a new and useful Instrument for Measuring Surfaces or Objects, or for Transferring Measurements from Drawings to Actual Work, or vice versa, of which the following is a specification.

This invention relates to an instrument for measuring surfaces or objects, in which is provided an index finger or base to indicate base-line; graduated standards with one or more movable holders carrying indicator-points, which can be set at any angle in a vertical plane; a graduated cross-bar carried in head-blocks upon each standard, which is adjustable both in height and length; a spirit-level movable around a fixed center in the cross-bar to permit the adjustment of said bar at any desired angle, and one or more movable holders upon said cross-bar carrying graduated indicator-points, which can be set at any angle in a vertical plane.

A further feature of my instrument is that I provide for extending the length of the cross-bar and standards.

I attain these objects by the mechanism illustrated in the accompanying drawings, in which—

Figure 1 is a front view of the entire instrument. Fig. 2 is a side view of a standard, its head-block, and an end view of the graduated cross-bar. Fig. 3 is a side view of a movable holder used on a standard. Fig. 4 is a side view of a movable holder used on the cross-bar, and Fig 5 is a top view of the cross-head with the standard.

Similar figures refer to similar parts throughout the several views.

The standards are each represented by the figure 5, each provided with a foot or base 6, and also with a finger-index 7. Each standard is also provided with a scale (indicated in the drawings by the cross-lines) to indicate length and subdivisions thereof. A cross-bar 8 is provided at its lower edge with a scale to indicate length and the subdivisions thereof. Such cross-bar is also longitudinally grooved on opposite sides, as at 9. Within a circular aperture cut through the cross-bar is inserted a rim 10, interiorly grooved, carrying a spirit-level 11, arranged to be movable around a fixed center, provided with an indicator-point, to indicate the degrees marked upon such rim. By means of this spirit-level the operator may, as hereinafter explained, determine the angle in which the cross-bar is set. Each standard is provided with a head-block 12, through a vertical aperture in which the standard is inserted, and held in any desired position by a set-screw 13. Each standard 5 has a shallow longitudinal groove *a*, and, also, the top surface of each head-block 12 has a shallow groove *b* adjacent to the standard aperture therein, by which means the operator may adjust the standard so that the respective grooves will meet so as to form the vertex of an angle. These grooves are shown in Fig. 5. The head-block in the rear of the standard aperture is provided with a longitudinal aperture having at its base inward tongues 15 to receive the cross-bar, and it is also provided with a set-screw 16 to hold said cross-bar in a desired position.

The holder 17 is movably attached to the standard 5 through its vertical aperture, and held at any desired position by the set-screw 19. A graduated semicircle 20 is secured on the front face of the holder 17, suitably marked to indicate the degrees of a circle. Attached to the face of such plate at its center by a pin is the indicator-point holder 21, arranged so that it may rotate on such pin. The plate is provided with a semicircular slot 22 and the indicator-point holder with a set-screw 23, registering with said slot, by means of which the indicator-point holder is held in any desired position. A shallow groove 24 is cut in the top and bottom surface of the holder 17, adjacent to the aperture, to enable the operator to adjust it with the groove 14 of the standard, so that the two will form the vertex of an angle.

The indicator-point holder is provided with a vertical finger-index 25, so that the rotation of such holder upon its pin may be indicated in degrees upon the semicircle-plate 20. Such indicator-point holder is also longitudinally perforated to receive the indicator-point 26, which is held in any desired position by the set-screw 27. Said indicator-point is provided with a scale for indicating length and subdivisions thereof.

The movable holder 28 is provided with a longitudinal aperture, with inward tongues 29 at the base to receive the cross-bar 8, and a set-screw 30 is used to hold such holder in position on the cross-bar. A graduated semicircle-plate 31 is secured on the front face of the holder 28, suitably marked to indicate the degrees of a circle. Attached to the face of said plate at the center by a pin, is an indicator-point holder 32, arranged so that it may rotate on such pin. The plate is provided with a semicircular slot 33 and the indicator-point holder with a set-screw 34, registering with said slot, by means of which the indicator-point holder is held in any desired position. The indicator-point holder is provided with a vertical finger-index 35, so that the rotation of such holder upon its pin may be indicated in degrees upon the semicircle-plate 31. Such indicator-point holder is vertically perforated to receive the indicator-point 36, which is held in any desired position by the set-screw 37. Said indicator-point is provided with a scale for indicating length and subdivisions thereof. Attached to the bottom surface of the movable holder and at its center is a pendent finger-index 38, which indicates the movement of the holder on the cross-bar by means of the scale thereon.

The cross-bar may be arranged so that it may be extended by attaching additions by means of a tongue in the end of one and a groove in the end of the other, secured in position by a flush set-screw. The standards may be arranged so as to be extended by attaching additions in a similar manner, or substantially so.

In operation the instrument is placed in position so that the index-finger 7 will be in line over the base-line and in line with all center points. Such adjustment may be made by removing the indicator-point 36 and inserting a line through the center of the aperture, having attached a plumb-bob to adjust the instrument in line with the base-line. The head-blocks are then moved on the standards until the cross-bar stands level. The indicator-points are then placed in contact with the work to be measured and firmly fastened by means of the set-screws. The measurements may then be read and transferred to the drawing or the instrument applied to another piece of work which is intended to be duplicated. In case of transferring drawings to work the instrument is set to indicate the measurement and then placed over the work to be measured in the proper position. Said indicator-points will then show the correct measurements. In enlarging or diminishing the scale the instrument can be set to proportional measurements.

From the description given the mode of operation of the instrument may be readily understood by any person skilled in the art.

What I claim as new, and desire to secure by Letters Patent, is—

1. In an instrument for measuring surfaces or objects and for transferring measurements from drawings to actual work, and vice versa, the combination of the graduated standards, movable holder on one of the standards, and indicator-point holder attached to said movable holder moving around a fixed center therein, a graduated indicator-point movably attached to such indicator-point holder, a graduated semicircle-plate attached to the holder on said standard, a head-block upon each standard, a graduated cross-bar carried by such head-block, a spirit-level in such cross-bar movable around a fixed center, a holder and graduated semicircle-plate movably carried on such cross-bar, an indicator-point holder attached to such holder and plate moving around a fixed center therein, a graduated indicator-point movably attached to such indicator-point holder, and a base index-finger on each standard in line of all center points, substantially as described.

2. In an instrument for measuring surfaces or objects and for transferring measurements from drawings to actual work, and vice versa, in combination with a graduated cross-bar, cross-heads and standards, the movable holders, one carried upon the standard and the other carried upon the cross-bar, each provided with a semicircle-plate indicating degrees, and an indicator-point holder moving around a fixed center, and each indicator-point holder provided with a movable graduated indicator-point, substantially as described.

3. In an instrument for measuring surfaces or objects and for transferring measurements from drawings to actual work, and vice versa, in combination with a graduated cross-bar, cross-heads and standards, the movable holder and semicircle angle-plate provided with the pendent finger-index, and the indicator-point holder with the vertical index-finger carrying the movable graduated indicator-point, and attached to such movable holder to move around a fixed center of the diameter of said semicircle angle-plate, substantially as described.

4. In an instrument for measuring surfaces or objects and for transferring measurements from drawings to actual work, and vice versa, in combination with a graduated cross-bar, cross-heads and standards, the movable holder on the standard and semicircle angle-plate, and the indicator-point holder with index-finger carrying the movable graduated indicator-point, and attached to such standard movable holder to move around a fixed center of said semicircle angle-plate, substantially as described.

JOHN H. W. SCHMIDT.

Witnesses:
C. HUGO SCHMIDT,
A. W. CANTWELL.